United States Patent [19]

Lattion

[11] Patent Number: 4,558,776
[45] Date of Patent: Dec. 17, 1985

[54] APPARATUS FOR ARRANGING CROSS-WOUND PACKAGES ON AN AUXILIARY TRANSPORT BELT

[75] Inventor: André Lattion, Seuzach, Switzerland

[73] Assignee: Rieter Machine Works Ltd., Winterthur, Switzerland

[21] Appl. No.: 510,557

[22] Filed: Jul. 5, 1983

[30] Foreign Application Priority Data

Jul. 20, 1982 [CH] Switzerland ............... 4409/82

[51] Int. Cl.[4] ............... B65G 47/30; B65G 43/08
[52] U.S. Cl. ........................... 198/429; 198/430; 198/460; 414/68; 414/69
[58] Field of Search ............ 198/460, 429, 430, 856, 198/433, 502, 857, 457, 426, 462; 242/35.5 A; 414/68, 70, 71, 89, 69

[56] References Cited

U.S. PATENT DOCUMENTS

| 30,791 | 11/1981 | Kupcikevicius | 198/857 |
|---|---|---|---|
| 1,620,778 | 3/1927 | Odom | 198/430 |
| 2,297,253 | 9/1942 | Scotti | 414/70 |
| 3,160,259 | 12/1964 | Dalton | 198/457 |
| 3,195,709 | 7/1965 | Physioc, III | 198/457 |
| 3,515,254 | 6/1970 | Gary | 198/502 |
| 3,547,248 | 12/1970 | Mencacci | 198/430 |
| 3,550,789 | 12/1970 | Jaeger et al. | 198/430 |
| 3,618,790 | 11/1971 | Carmody | 414/71 |
| 3,776,342 | 12/1973 | Kulig et al. | 198/430 |
| 3,872,964 | 3/1975 | Higgins | 198/857 |
| 4,029,210 | 6/1977 | Thompson et al. | 198/460 |
| 4,079,844 | 3/1978 | Whitaker et al. | 414/68 |
| 4,227,607 | 10/1980 | Malavenda | 198/460 |
| 4,231,697 | 11/1980 | Franz | 414/68 |
| 4,360,098 | 11/1982 | Nordstrom | 198/460 |
| 4,371,076 | 2/1983 | Nakao | 198/429 |
| 4,396,335 | 8/1983 | Brandsetter et al. | 242/35.5 A |

FOREIGN PATENT DOCUMENTS

| 1250337 | 9/1967 | Fed. Rep. of Germany | 198/426 |
|---|---|---|---|
| 2243227 | 3/1974 | Fed. Rep. of Germany | 198/856 |
| 2446785 | 9/1980 | France | 198/430 |
| 522454 | 4/1955 | Italy | 414/71 |
| 2867 | 1/1978 | Japan | 198/857 |
| 902325 | 8/1962 | United Kingdom | 414/68 |
| 927878 | 6/1963 | United Kingdom | 414/68 |
| 1103066 | 2/1968 | United Kingdom | . |

Primary Examiner—Joseph E. Valenza
Assistant Examiner—Daniel R. Alexander
Attorney, Agent, or Firm—Werner W. Kleeman

[57] ABSTRACT

An apparatus for arranging cross-wound packages, wound on a spinning machine, upon an auxiliary transport belt which is aligned with a main transport belt extending longitudinally of the spinning machine and serving for carrying away the cross-wound packages. One end of the auxiliary transport belt adjoins one neighboring confronting end of the main transport belt. A detector is actuated by the cross-wound packages moved by the transport belt and initiates starting of the auxiliary transport belt upon the arrival of a cross-wound package. Also, there is provided a stopping device for the auxiliary transport belt, whereby the latter is stopped after it has moved through a distance at least approximately equal to the bobbin length. The currently known continuous sliding of the transport belt under the full cross-wound packages is thus avoided. There is also avoided that the thread layers of the cross-wound packages entangle with one another or come to lie at the end faces of the cross-wound packages which would severely impede unwinding thereof or even make such unwinding impossible.

12 Claims, 3 Drawing Figures

APPARATUS FOR ARRANGING CROSS-WOUND PACKAGES ON AN AUXILIARY TRANSPORT BELT

BACKGROUND OF THE INVENTION

The present invention broadly relates to a new and improved construction of apparatus for arranging cross-wound packages upon an auxiliary transport belt.

In its more specific aspects, the present invention relates to a new and improved apparatus for arranging cross-wound packages, which have been wound upon a spinning machine, upon an auxiliary transport belt forming an extension or prolongation of a main transport belt which extends longitudinally of the spinning machine and serves to carry away the cross-wound packages. The start of the transport path provided by the auxiliary transport belt adjoins the end of the transport path provided by the main transport belt. The lengthwise or longitudinal axes of the cross-wound packages extend parallel to their direction of movement during transport of the cross-wound packages upon the transport belts.

While the description to follow, as a matter of convenience, refers to the handling of cross-wound packages, obviously other types of packages or the like can be conveniently handled, and therefore, the use of this term is not to be construed in a limiting sense in any way whatsoever, merely is to be viewed as an exemplary and desirable field of application for the inventive apparatus.

In an apparatus as known, for example, from German Pat. No. 2,842,432 for handling cross-wound packages, the cross-wound packages pass from a transport belt extending longitudinally of the spinning machine onto a second transport belt and thereafter fall from the latter into a transport container.

In an apparatus as disclosed, for example, in British Pat. No. 1,103,066, full packages removed from the spinning machine are lined-up upon a belt until a predetermined number of packages is present. Thereupon, a photocell/light beam combination operates a pusher which simultaneously pushes the packages into a container.

It is a disadvantage of these known arrangements that the cross-wound packages are allowed to fall, because then their outer thread windings can be damaged. The use of a transport belt which, in operation, slides beneath the full packages for fairly long periods of time, as disclosed in the above mentioned British Pat. No. 1,103,066, has proved particularly disadvantageous, since the thread layers in the case of cross-wound packages can entangle with one another, and thus, the threads can rupture. In particular, threads can thus slip or slide over the edge of the cross-wound package, so that instead of lying on the side surfaces of the cross-wound packages, they lie on an end surface thereof. Consequently, unwinding of the cross-wound packages upon appropriate textile machines suitable for this purpose is made much more difficult or even rendered impossible during further processing of the yarn or thread of such cross-wound packages. Presently, attempts are made to take the threads or the like directly from the cross-wound packages delivered from the spinning machines, in order to avoid any rewinding thereof for further processing such as, for example, during weaving or knitting. Accordingly, perfectly wound cross-wound packages are of considerable importance.

SUMMARY OF THE INVENTION

Therefore, it is a primary object of the present invention to avoid the aforementioned problems.

It is a further important object of the present invention to provide a new and improved apparatus for arranging cross-wound packages upon an auxiliary transport belt in a manner which is not associated with the aforementioned drawbacks and limitations of the prior art constructions.

Now in order to implement these and still further objects of the invention, which will become more readily apparent as the description proceeds, the apparatus of the present development is manifested by the features that, there is provided a detector for controlling the movement of the auxiliary transport belt and which is actuated by the packages moved by the transport belts. The detector is located at the region of the two transport paths, defined by the transport belts, which adjoin one another and causes the start-up of the auxiliary transport belt when passed by a cross-wound package. Means are provided for stopping the auxiliary transport belt after movement thereof through a distance which is at least approximately equal to the length of the bobbin of the cross-wound packages.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
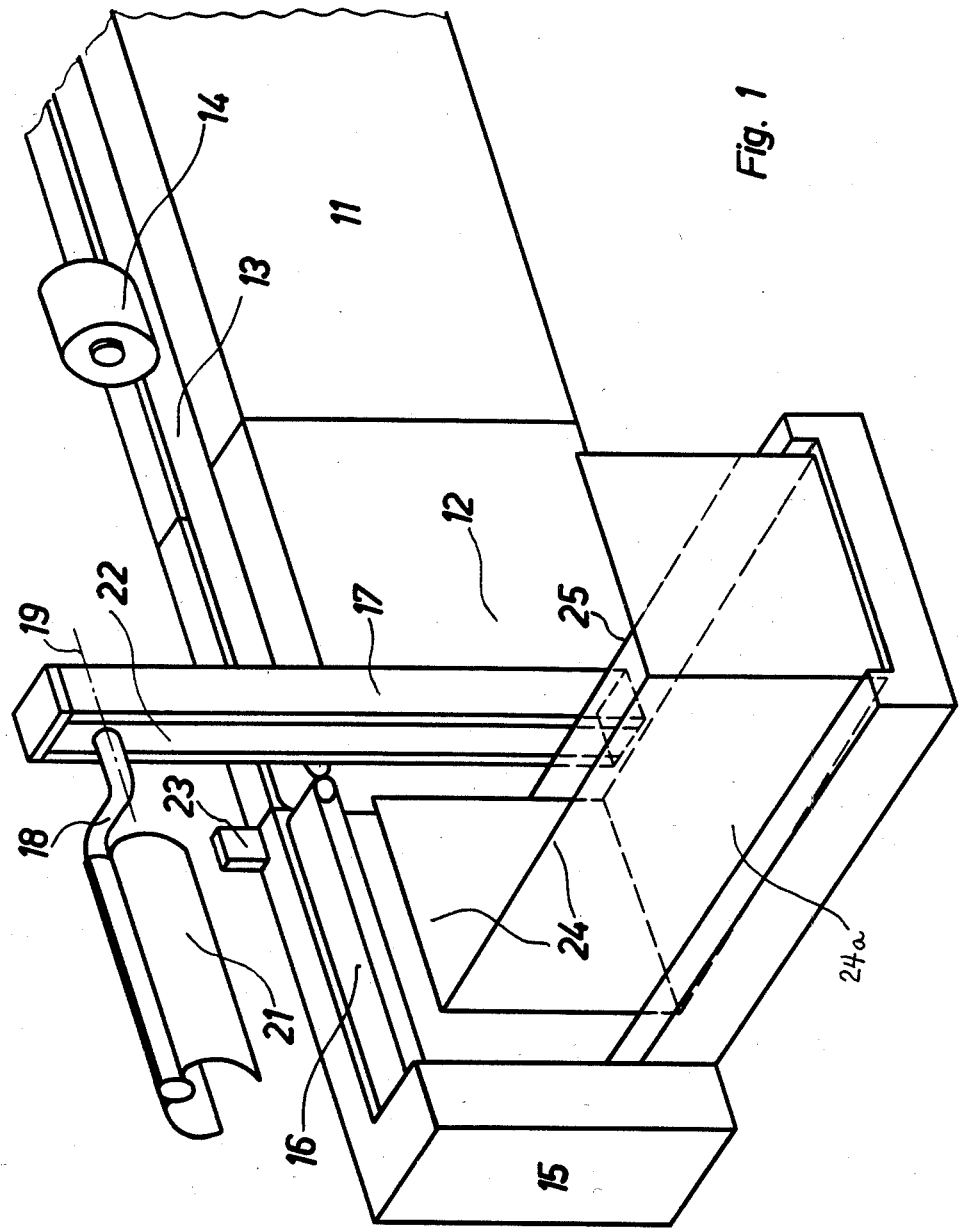
FIG. 1 is a perspective illustration of an apparatus for handling cross-wound packages and constructed according to the present invention.

Describing now the drawings, it is to be understood that only enough of the construction of the handling apparatus and related textile machine has been shown as needed for those skilled in the art to readily understand the underlying principles and concepts of the present development, while simplifying the showing of the drawings. Turning attention now specifically to FIG. 1, there has been shown therein in perspective view a first exemplary embodiment of the apparatus according to the invention. There will be recognized a schematically indicated spinning machine 11 having a plurality of conventional spinning locations or positions (not illustrated) adjoined by a drive or end head 12. Over the complete length of the spinning machine 11 there extends a main or primary transport belt 13 upon which cross-wound packages 14, wound on the spinning machine 11, are transported in a predetermined direction towards the drive or end head 12. Neighboring the latter is a cross-wound package stacker 15 comprising an auxiliary transport belt 16 which receives cross-wound packages 14 delivered thereto from the main transport belt 13 and moves the same from the right to the left as viewed in FIG. 1.

As will be evident from the showing of FIG. 1, the end of the transport path formed or defined by the main transport belt 13 adjoins or neighbors the start of the transport path formed or defined by the auxiliary transport belt 16. A cross-wound package grab or gripper device 21 carried by an arm 18 and pivotally secured thereto is movable up and down along a column or upright member 17, the arm 18 being guided for vertical movement in a guide slot 22. The arm or arm member 18 is also pivotable about the axis 19. Furthermore, a detector or sensor 23 is provided which is responsive to the cross-wound packages 14 moving past the same. For this purpose, the detector 23 may contain a conventional capacitor which experiences a change of capacitance which is caused by the cross-wound packages 14 moving past, as is well known for such capacitive-type contactless detectors. The capacitance change causes the generation of a suitable signal. Additionally, there is provided a cross-wound package carriage 24 or equivalent structure, the floor 24a of which is slightly inclined downwardly towards the rear as viewed in FIG. 1.

The provision of the downwardly inclined floor 24a has the beneficial effect that cross-wound packages 14 filled into the package carriage 24 do not start to roll provided that the package filling operation is started at the lowest part of the floor 24a and is continued towards the highest part thereof. For the sake of completeness it is here mentioned that in place of a downwardly inclined floor, a package carriage with a corrugated floor structure also can be used in which the cross-wound packages are then positioned in the troughs of the corrugations of such corrugated floor. In such case, the mechanical deposition of the cross-wound packages is controlled in accordance with the design of the floor.

During operation of the apparatus shown in FIG. 1, the full cross-wound packages 14 arrive at freely selectable time intervals upon the main transport belt 13 which in general is continuously moving. The lengthwise axes of the cross-wound packages 14 reposing upon the main transport belt 13 extend essentially parallel to their direction of movement, i.e. to the direction of movement of the main transport belt 13. As soon as a cross-wound package 14 arrives at the detector 23, the latter is affected in the previously described manner by the cross-wound package 14. In this way, a starting signal is generated by means of which the auxiliary transport belt 16, which heretofore has been stationary, starts to move at the moment when the arriving cross-wound package 14 is pushed or transferred by the main transport belt 13 onto the auxiliary transport belt 16. When the cross-wound package 14 has moved past the detector 23, the capacitor thereof again experiences a capacitance change, whereby now a stop signal is generated and the auxiliary transport belt 16 is again brought to standstill. The starting and stopping of the auxiliary transport belt 16 is thus controlled by the same detector 23. Upon the arrival of a successive cross-wound package 14, the operation as described hereinbefore is repeated so that a second cross-wound package 14 now is placed on the auxiliary transport belt 16. By suitably setting the detector 23, it will be possible to ensure that the second cross-wound package 14 is lined-up immediately adjacent the first cross-wound package 14.

When, in this manner a predetermined number of cross-wound packages 14, for example, four, have been lined-up in succession adjacent one another upon the auxiliary transport belt 16, which can be established, for example, by the use of a suitable distance measuring device like, for example, a step counter measuring the distance through which the auxiliary transport belt 16 has moved, then the package grab or gripper device 21 is downwardly moved and the four cross-wound packages 14 lined-up on the auxiliary transport belt 16 are positively grasped by the cross-wound package grab 21. In the illustrated exemplary embodiment the arm 18 is thereafter pivoted through about 180° about the axis 19, the pivotably mounted package grab 21 remaining in the illustrated downwardly directed position. After lowring of the grab 21, the four cross-wound packages 14 carried thereby are placed in the package carriage 24.

Instead of using the depicted package grab or gripper device 21 pivotable about the pivot axis 19, a fixed i.e. non-pivotable grab can be provided and in such case the auxiliary transport belt 16 instead can be, for example, constructed to be downwardly pivotable.

The side wall 25 of the package carriage 24 is advantageously lower than the other three side walls thereof, so that in the illustrated embodiment the cross-wound packages 14 do not have to be dropped by the grab 21 when they are released. Consequently, there is possible sufficient lowering of the arm 18 and the grab 21. If it is desired that all four walls of the package carriage 24 are of the same height, then a higher column 17 is provided and the cross-wound package grab 21 is secured to a downwardly extending arm which can dip into the space between the four carriage walls and at the lower end of this arm the package grab 21 is then mounted for pivotal movement about a horizontal axis.

Figure 2:
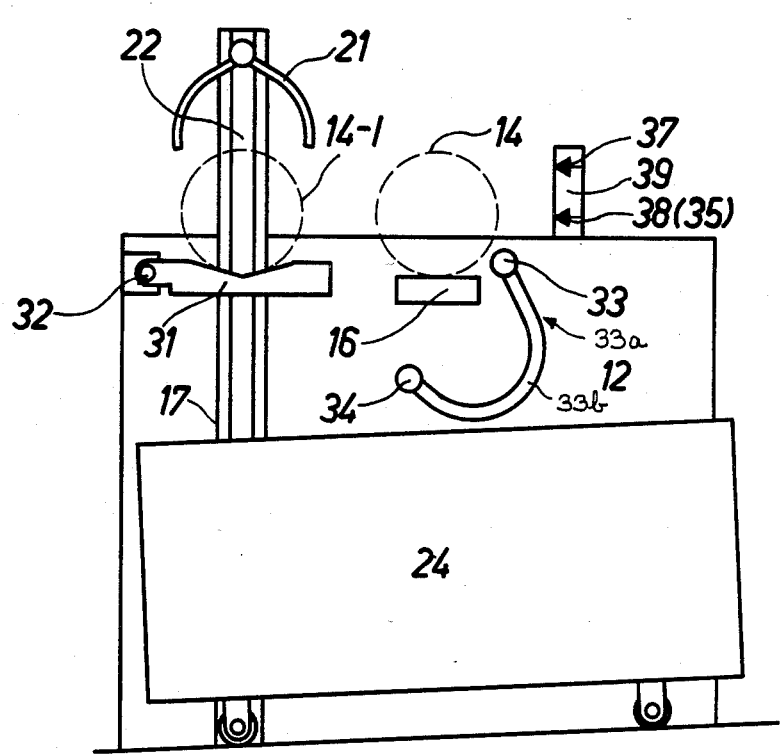
FIG. 2 is a schematic cross-sectional view through a further embodiment of the apparatus according to the invention, taken substantially along the line 2—2 of FIG. 3.
Figure 3:
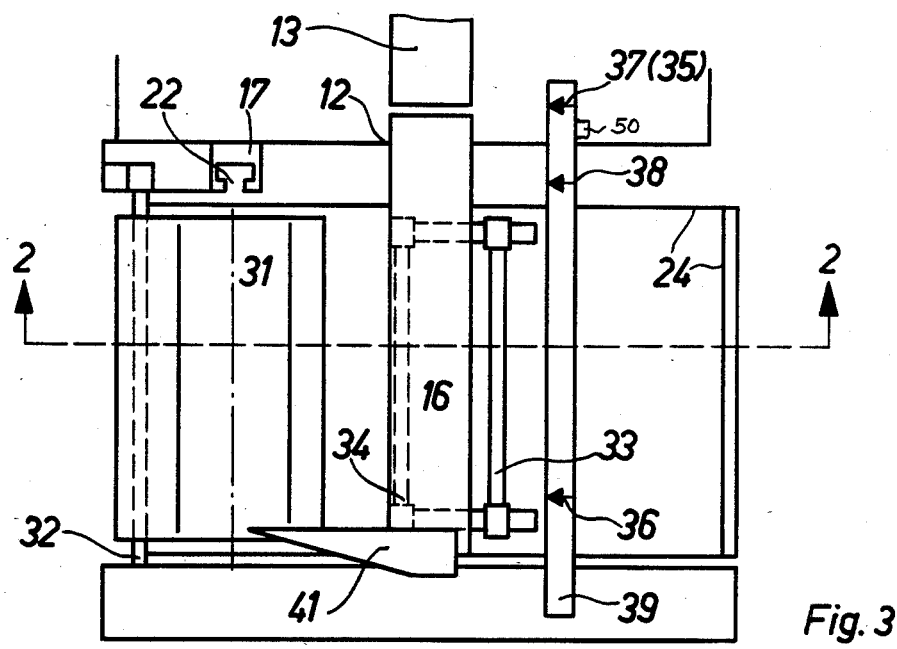
FIG. 3 is a top plan view of the apparatus shown in FIG. 2.

In the further embodiment of the inventive apparatus as shown in FIGS. 2 and 3, the elements or parts which are identical or analogous to the elements or parts of the first embodiment of FIG. 1 have been generally designated by the same reference numerals. The main and auxiliary transport belts 13 and 16 are again illustrated as is also a cross-wound package 14. Furthermore, there are here also provided a drive or end head 12 and a column 17. The guide slot 22 again forms guide means for the up and down or elevational movement of the cross-wound package grab or gripper device 21. Additionally, a cross-wound package carriage 24 is provided.

A trough 31 or equivalent support element receives the cross-wound packages 14 transported away or outfed by the auxiliary transport belt 16. The trough 31 is downwardly pivotable into a substantially vertical position by means of the pivot shaft 32, in order to enable any desired upward and downward movement of the package grab 21 along the column 17. A cross-wound package pusher 33a comprises a pusher rod 33 pivotable about a shaft 34 and carried by brackets 33b. Suitable detectors, here photocells 35, 36, 37 and 38 are provided in a housing 39. The conventional light sources associated with the detectors, here the photocells 35, 36, 37, 38 are not particularly shown in FIGS. 2 and 3 to simplify the illustration. Their light beams are directed from the left as viewed in FIGS. 2 and 3, in known manner to the photocells 35, 36, 37 and 38. The photocell 35 is located vertically below the photocell 37 and at the same level as the other photocells 36 and 38. At one end of the auxiliary transport belt 16 there is located an abutment or stop 41 for the cross-wound packages 14. For better clarity the cross-wound package grab 21, the cross-wound package 14 and the cross-wound package 14-1 are not shown in FIG. 3.

During operation of the apparatus as shown in FIGS. 2 and 3, the cross-wound packages 14 are again transported from the main transport belt 13 to the auxiliary transport belt 16. The two transport belts 13, 16 are aligned and the lengthwise axes of the cross-wound packages 14 extend substantially parallel to their direction of movement, i.e. in the direction of movement of the belts or bands 13, 16. With the arrival of a first cross-wound package 14 at the location of the adjacent or neighboring ends of the transport paths defined by the transport belts 13 and 16, the photocell 35 is activated. Consequently, the auxiliary transport belt 16 is set into motion and the first cross-wound package 14 fed thereto by the main transport belt 13 is taken-up by the auxiliary transport belt 16. As soon as this first cross-wound package 14 no longer blocks the light beam to the photocell 35, the auxiliary transport belt 16 is again stopped.

With the arrival of a second cross-wound package 14, the photocell 35 is again activated, the auxiliary transport belt 16 is thus again set into motion, the second cross-wound package 14 is lined-up in close proximity to the first cross-wound package 14 and with deblocking of the light beam to the photocell 35 by the second cross-wound package 14 the auxiliary transport belt 16 is again stopped, in the manner as has already been explained previously with reference to FIG. 1. This sequence is repeated until the first cross-wound package 14 is moved towards the abutment 41 to such an extent as to activate the photocell 36. The activation of the latter stops the main transport belt 13 and initiates operation of the pusher rod 33 after the auxiliary transport belt 16 has been brought to standstill. The pusher rod 33 laterally displaces the cross-wound packages 14 located on the auxiliary transport belt 16, so that they come to rest upon the trough or support 31 in the position indicated by the phantom line illustrated cross-wound package 14-1. After completion of the return motion of the pusher rod 33, the main transport belt 13 is again set in motion and cross-wound packages 14 again can be lined-up upon the auxiliary transport belt 16. Additionally, the cross-wound package grab 21, which is movable up and down along the guide slot 22 of the column 17, is operated and grasps and lifts the cross-wound packages 14-1. The trough 31, then, is pivoted, for example, downwardly about the pivot shaft 32, the cross-wound package grab 21 is downwardly moved and the cross-wound packages 14-1 grasped thereby are placed in the package carriage or carrier 24.

There are possible a multitude of constructional variations in the apparatus according to the invention, of which the following exemplary possibilities are mentioned hereinbelow:

According to a further modification of the embodiment shown in FIGS. 2 and 3, only one kind of control operation is generated by the detector 35, namely the setting in motion of the auxiliary transport belt 16 upon arrival of the cross-wound packages 14. Measures are taken by means of which the auxiliary transport belt 16 is moved after each start-up thereof through a distance which is equal to the bobbin length of the cross-wound packages 14, and by means of which the auxiliary transport belt 16 is thereafter automatically again inactivated. Such a mode of operation can be achieved by using a suitable distance measuring device, schematically indicated in FIG. 3 by reference character 50.

In a further modification of the embodiment shown in FIGS. 2 and 3, the auxiliary transport belt 16 is set in motion by a starting signal supplied by the photocell 35. Stopping of the auxiliary transport belt 16 is not effected in this modification by the photocell 35, but by a stop signal supplied by a photocell 38, at which a signal is generated by interruption of the light beam directed to such photocell 38. The spacing of the detector 38 from the detector 35 is chosen such that the distance travelled by the auxiliary transport belt 16 between the starting signal and an immediately successive stop signal is equal to the bobbin length of the cross-wound packages 14. With such an arrangement, the distances of the individual travels or incremental movements of the auxiliary transport belt 16 can be precisely set, in particular if the photocell 38 is conveniently adjustable in the longitudinal direction of the housing 39. Additionally, the accelerations (decelerations) on starting and stopping the auxiliary transport belt 16 can be taken into account in any desired manner, and thus, also can be selected in any desired manner.

The signal of the photocell 36, in the embodiment as shown in FIGS. 2 and 3, can also cause stopping of the auxiliary transport belt 16 after a predetermined time-delay. This results in the front or leading cross-wound package 14 striking the abutment 41 and in the other succeeding or trailing cross-wound packages in the series being pushed against the front cross-wound package, so that spaces eventually present between adjacent cross-wound packages 14 are eliminated. Sliding of the auxiliary transport belt 16 during this operation, primarily upon the front cross-wound package, will of course have to be kept as small as possible and is to be limited, so that no sliding of the threads over the edges of the cross-wound packages occurs, something which is to be avoided in accordance with the invention.

If it is desired to hold down the costs for automation, it is advantageous to use a modification including only the detectors 35 and 36 and in which the trough 31 or the like and the cross-wound package grab 21 including the column 17 are omitted. In this modification the detector 35 controls the series or sequential arrangement of the cross-wound packages 14 upon the auxiliary transport belt 16. As a result of the operation of the detector 36, a signal is generated to stop the transport belts 13 and 16. The signal indicates to the attendants that the cross-wound packages 14 will have to be manually removed from the auxiliary transport belt 16. After this has been carried out, the transport belts 13 and 16 are again set into operation. It will be evident that in such a modification, the auxiliary transport belt 16 is advantageously made as long as possible. In this case, it may for example, extend not only over the package stacker 15 shown in FIG. 1 but also over the drive or end head 12, in which case then the main transport belt 13 extends only up to the drive or end head 12.

As already previously mentioned, a second photocell 37 is arranged above the photocell 35. In a further modification, the latter serves for monitoring the position of cross-wound packages 14 arriving at the auxiliary transport band 16. If, for example, in these cross-wound packages, as will normally be the case, the bobbin length is smaller than the cross-wound package diameter, then a tipped or turned-over or improperly positioned cross-wound package will not generate a signal at the photocell 37 as it moves past the same. The absence of such signal may be beneficially used to indicate the occurrence of an undesirable or improper position of a cross-wound package. It will be evident that by suitably positioning the photocell 37 or by providing a plurality thereof, various possibilities for monitoring the cross-wound packages can be obtained.

The aforementioned exemplary described detectors or sensors rely upon a change in capacitance of a capacitor or the change of a light beam directed to a photocell and represent examples of contactless detectors or sensors. However, the use of other detectors or sensors of, for example, a mechanical nature is also within the scope of the present invention.

While there are shown and described present preferred embodiments of the invention, it is to be distinctly understood that the invention is not limited thereto, but may be otherwise variously embodied and practiced within the scope of the following claims.

Accordingly, what I claim is:

1. An apparatus for removing cross-wound packages having a predetermined bobbin length from a spinning machine, and comprising:

a main transport belt extending substantially lengthwise of the spinning machine for receiving cross-wound packages therefrom and serving to deliver said cross-wound packages to one end of a transport path defined by said main transport belt;

each of said cross-wound packages having a lengthwise axis extending substantially parallel to their direction of movement during transport upon said main transport belt;

an auxiliary transport belt positioned substantially in alignment with said main transport belt and defining a transport path having a starting end adjoining said one end of said transport path of said main transport belt;

means for limiting to an acceptable minimum, during the removal of said cross-wound packages from said spinning machine, any relative sliding movement between said auxiliary transport belt and said cross-wound packages;

said limiting means comprising detector means for controlling the movement of said auxiliary transport belt;

said detector means being arranged at a region where said transport path of said auxiliary transport belt neighbors said transport path of said main transport belt;

said detector means being activated by said cross-wound packages on said transport belts in order to initiate movement of said auxiliary transport belt whenever one of said cross-wound packages passes said detector means;

said limiting means further comprising stopping means for stopping said auxiliary transport belt after movement of the same through a distance at least approximately equal to the bobbin length of said cross-wound packages such that a successive arrangement of a closely spaced predetermined number of said cross-wound packages can be formed on said auxiliary transport belt; and said limiting means still further comprising removal means for removing in substantially frictionless manner at least one of said cross-wound packages from said auxiliary transport belt.

2. The apparatus as defined in claim 1, wherein:
   said stopping means comprises a detector activated by said cross-wound packages located upon said auxiliary transport belt; and
   said detector, when activated, initiating stoppage of said auxiliary transport belt.

3. The apparatus as defined in claim 1, wherein:
   said stopping means comprises a distance measuring device.

4. The apparatus as defined in claim 1, wherein:
   said detector means defines a common detector for effecting starting and stopping of said auxiliary transport belt.

5. The apparatus as defined in claim 2, wherein:
   said detector means comprises a first detector for initiating the starting of movement of said auxiliary transport belt;
   said detector of said stopping means being different from said first detector; and
   said detector of said stopping means being arranged at such a distance from said first detector that the amount of travel of said auxiliary transport belt within the time period between the starting and stopping of said auxiliary transport belt is at least approximately equal to said bobbin length of said cross-wound packages.

6. The apparatus as defined in claim 1, further including:
   a detector for generating a signal caused by a leading one of a number of cross-wound packages located upon said auxiliary transport belt passing said detector.

7. The apparatus as defined in claim 1, wherein:
   said removal means simultaneously remove said cross-wound packages arranged in succession upon said auxiliary transport belt.

8. The apparatus as defined in claim 7, wherein:
   said removing means comprises a cross-wound package grab means for simultaneously grasping and removing a plurality of said successively arranged cross-wound packages from said auxiliary transport belt.

9. The apparatus as defined in claim 7, wherein:
   said removing means comprise a trough extending substantially parallel and immediately adjacent to said auxiliary transport belt in order to receive said cross-wound packages arriving upon said auxiliary transport belt; and
   said removing means further comprising a cross-wound package pusher for displacing said cross-wound packages from said auxiliary transport belt to said trough.

10. The apparatus as defined in claim 1, wherein:
    said detector means comprises a multiplicity of detectors actuatable by means of said cross-wound packages moved upon said auxiliary transport belt and upon said main transport belt and supplying indicating signals; and
    said indicating signals being different for cross-wound packages assuming an undesired position in comparison to indicating signals generated by cross-wound packages assuming an orderly position.

11. The apparatus as defined in claim 6, further including:
    abutment means for said cross-wound packages provided at a terminal end of said travel path defined by said auxiliary transport belt;
    said detector being arranged at said terminal end; and
    said signal generated by said detector serving to stop said auxiliary transport belt.

12. The apparatus as defined in claim 1, wherein:
    said detector means comprises a contactless sensor.

* * * * *